Patented Sept. 26, 1950

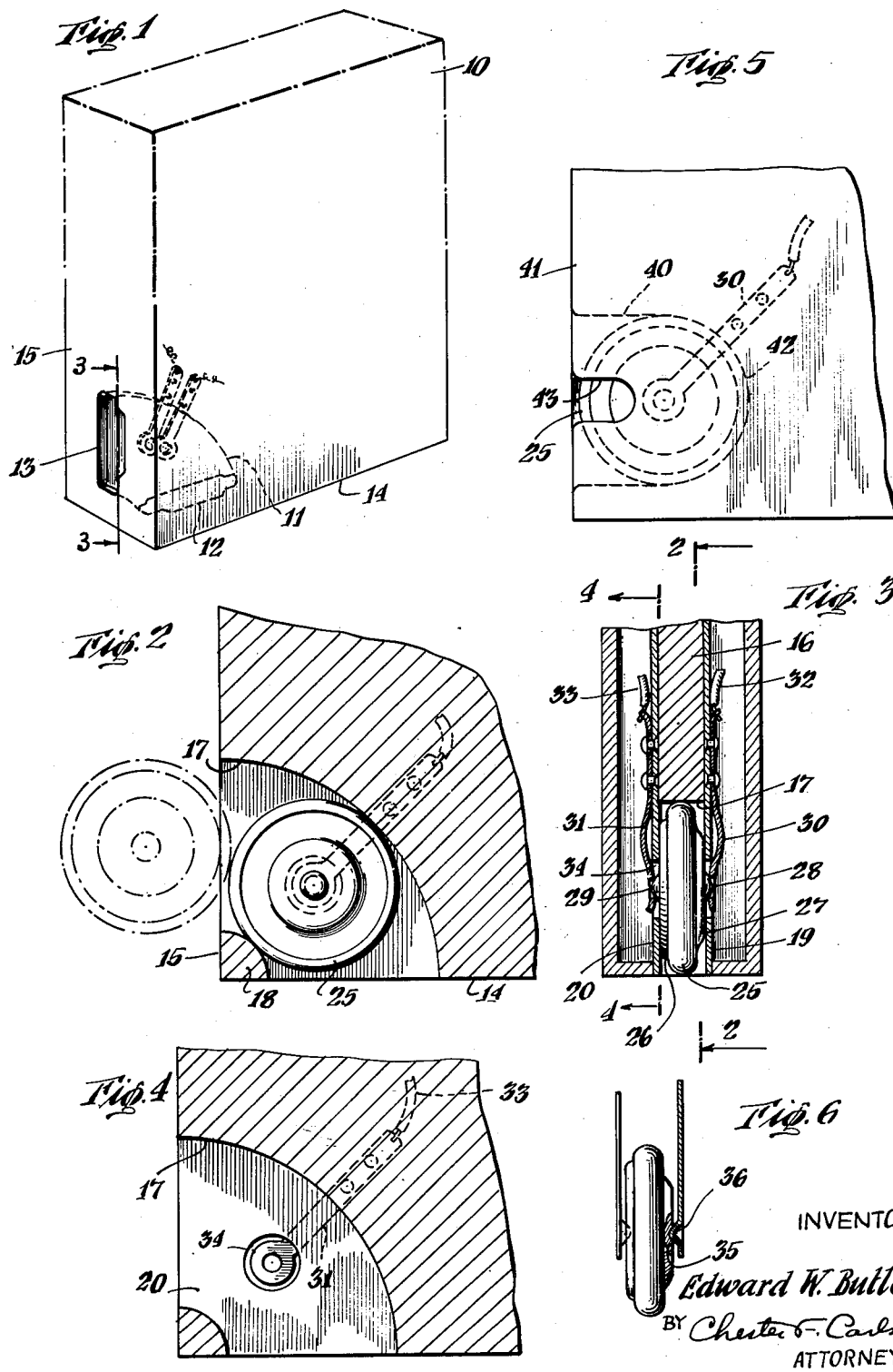

2,523,354

UNITED STATES PATENT OFFICE 2,523,354

BATTERY HOLDER FOR ELECTRICALLY OPERATED DEVICES

Edward W. Butler, Indianapolis, Ind., assignor to P. R. Mallory & Co., Inc., Indianapolis, Ind., a corporation of Delaware Application December 22, 1945, Serial No. 636,680

3 Claims. (Cl. 136—173)

The invention relates to portable electrically-operated devices such as hearing aids or radios and particularly to a cell or battery holder therefor.

An object of the invention is to improve battery or cell holders for portable electrically-operated devices.

The invention comprises the features of construction, combination of elements, arrangement of parts, and method of manufacture referred to above or which will be brought out and exemplified in the disclosure hereinafter set forth, including the illustrations in the drawings, the scope of the invention being indicated in the appended claims.

In the drawings:

Figure 1 is a perspective view of an electrically-operated device embodying the novel cell holder construction;

Figure 2 is a sectional view taken on the line 2—2 of Figure 3;

Figure 3 is a fragmentary vertical sectional view taken on line 3—3 of the device shown in Figure 1;

Figure 4 is a sectional view taken on the line 4—4 of Figure 3;

Figure 5 is a sectional view illustrating a modification of the invention; and

Figure 6 is a view showing the clips of Figure 5 in engagement with a cell.

Heretofore, the removal or replacement of dry cells in portable electrically-operated devices has usually necessitated opening the casing in order to remove the old battery or cell and insert a new one therein. This is disadvantageous since the wiring and circuit components inside such devices are apt to be injured during such replacement or removal. In accordance with this invention, a slideway is provided for receiving a cell, this slideway defining a slot which communicates with openings formed in one or more walls of the casing. A pair of contact members or clips are provided for holding a cell in proper position within the slideway and the construction is such that a cell held between the clips may be readily removed and replaced without opening the casing or disturbing the interior parts of the device.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be generic in their application to similar parts.

Referring now to the drawings in detail, a casing 10 is provided for housing an electrically-operated device such as a hearing aid or portable radio. A slideway 11 disposed within the casing communicates with openings 12 and 13 formed, respectively, in casing walls 14 and 15. The upper part of the slideway may be formed by a central panel 16 which is secured within the casing in any suitable manner, said panel having an arcuate surface 17 defining the upper portion of the battery slot. The lower portion of the slideway may be defined by the inner arcuate surface of a block 18 which is suitably secured to the walls 14 and 15 at the bottom of the casing. The sides of the slideway may be formed by plate members 19 and 20 which are secured to the panel 16 and the wall 14. The parts defining the slideway are constructed and arranged to receive a battery or dry cell which may be conveniently inserted therein through one of the openings 12 or 13.

In the example shown, a circular flat cell 25 is utilized having raised anode and cathode portions 26 and 27. The cell may be provided with contact projections 28 and 29 which may be engaged by complementary recessed terminals formed in a pair of contacts or spring clips 30 and 31, the latter being attached in any suitable manner to the plates 19 and 20, respectively. As shown, the clips are connected, respectively, to conductors 32 and 33 which lead to the terminals of the portable device as those skilled in the art will readily understand. Referring to Figure 3, it will be noted that the clips extend through apertures 34 formed in plates 19 and 20 and engage the respective terminals of the cell. It will be understood from the foregoing description that the configuration and construction of the slideway and clips may be readily modified to accommodate cells of different sizes and shapes. Instead of the contact arrangement shown in Figure 3, the terminals of the cell may be recessed as at 35, Figure 6, and the clips may be provided with complementary projections 36 which are adapted to engage the cell and hold the same in position. Moreover, it is within the purview of the invention to use any suitable kind of contacts to hold the cell in position within the slot. Thus, for example, a conductive plate may be disposed at one side of the slot for engagement by one terminal of the cell and a suitable spring contact may be disposed at the other side of the slot to engage the other terminal of the cell.

From the foregoing description, it will be apparent that a cell may be pushed into the slot 11 through the opening 13, for example. When the projections 28, 29 engage the recessed portions of the clips, the cell is held therebetween and current is supplied to the conductors 32, 33. When it is desired to replace the cell which is held between the clips, a new cell is inserted through opening 13 whereby the used cell is disengaged from the clips and pushed out through the opening 12. Consequently, it will be appreciated that it is a very simple matter to remove or replace a cell and that this may be accomplished without the necessity of opening the case of the device or making any adjustments thereto.

In the modification shown in Figure 5, the slot for receiving the battery is defined by a panel 40 and the adjacent walls of the casing, one of which is shown at 41. The panel 40 has an arcuate portion 42 which is engaged by the cell 25 when it is held between the clips 30 and 31. The casing is notched as at 43 so that the cell may be easily gripped for removal from the slot or for insertion therein. This construction is particularly advantageous in devices where the width of the casing is approximately the same as the width of the cell. It will be understood, however, that the construction may be easily modified and used with devices having a wider casing.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. A cell holder for a portable electrically-operated device comprising a casing, a slideway within said casing for receiving a cell, said slideway defining a slot having openings communicating with two adjacent walls of said casing, and a pair of clips at opposite respective sides of said slot for detachably holding a cell whereby a cell held between said clips is disengaged therefrom and pushed out through one of said openings when a new cell is inserted in the slot through the other one of said openings.

2. A cell holder for a portable electrically-operated device comprising a casing, an arcuate slideway open at two ends within said casing for receiving a cell, said slideway defining a slot communicating at each end thereof with an opening in a wall of said casing, the cross section of said slot substantially conforming to the cross section of said cell, and a pair of clips at opposite respective sides of said slot for detachably holding a cell therein whereby a cell held between said clips is disengaged therefrom and pushed out through one of said two ends of the slideway when a new cell is inserted in the slot through the other of said ends.

3. A cell holder for a portable electrically-operated device comprising a casing, a plurality of plate members forming a slot having openings communicating with two adjacent walls of said casing, each plate member having an aperture therein providing access to the terminals of a cell positioned in said slot, and a pair of spring clips extending through the respective apertures for detachably holding a cell in said slot permitting a cell held between said clips to be disengaged therefrom and pushed out through one of said openings when a new cell is inserted through the other of said openings.

EDWARD W. BUTLER.

REFERENCES CITED

The following references are of record in the file of this patent:

UNITED STATES PATENTS

| Number | Name | Date |
| --- | --- | --- |
| 2,176,671 | Huth | Oct. 17, 1939 |
| 2,251,928 | Field et al. | Aug. 12, 1941 |
| 2,308,270 | Cubert | Jan. 12, 1943 |

FOREIGN PATENTS

| Number | Country | Date |
| --- | --- | --- |
| 141,717 | Austria | Oct. 15, 1934 |